(12) United States Patent
Kim et al.

(10) Patent No.: US 8,479,232 B2
(45) Date of Patent: Jul. 2, 2013

(54) DISPLAY APPARATUS AND METHOD FOR SCHEDULING BROADCAST USING THE SAME

(75) Inventors: Won-il Kim, Gwacheon-si (KR);
Yong-hwan Kwon, Seongnam-si (KR);
Joon-hwan Kim, Yongin-si (KR);
Heui-jin Kwon, Seongnam-si (KR);
Chang-soo Lee, Seoul (KR);
Jeong-yeon Lee, Seongnam-si (KR);
Victor Szilagyi, London (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 12/630,533

(22) Filed: Dec. 3, 2009

(65) Prior Publication Data

US 2010/0180306 A1    Jul. 15, 2010

(30) Foreign Application Priority Data

Jan. 13, 2009  (KR) .................. 10-2009-0002628
Sep. 3, 2009   (KR) .................. 10-2009-0083202

(51) Int. Cl.
*G06F 13/00*    (2006.01)

(52) U.S. Cl.
USPC .............. 725/47; 725/13; 725/14; 725/38; 725/46; 715/200; 715/201; 715/700; 715/726; 386/291; 386/292; 386/293; 386/294; 386/295; 386/296; 386/297; 386/298; 386/299

(58) Field of Classification Search
None
See application file for complete search history.

(56) References Cited

U.S. PATENT DOCUMENTS

| | | | | |
|---|---|---|---|---|
| 5,825,352 | A * | 10/1998 | Bisset et al. | 345/173 |
| 6,590,568 | B1 | 7/2003 | Astala et al. | |
| 7,650,569 | B1 * | 1/2010 | Allen et al. | 715/720 |
| 2003/0035075 | A1 * | 2/2003 | Butler et al. | 348/734 |
| 2003/0137542 | A1 | 7/2003 | Zimmerman et al. | |
| 2005/0028208 | A1 * | 2/2005 | Ellis et al. | 725/58 |
| 2005/0172315 | A1 * | 8/2005 | Chen | 725/39 |
| 2005/0278741 | A1 * | 12/2005 | Robarts et al. | 725/46 |
| 2006/0123449 | A1 * | 6/2006 | Ma et al. | 725/58 |
| 2007/0214473 | A1 * | 9/2007 | Barton et al. | 725/28 |
| 2008/0055272 | A1 * | 3/2008 | Anzures et al. | 345/173 |
| 2008/0165136 | A1 * | 7/2008 | Christie et al. | 345/173 |
| 2008/0301729 | A1 * | 12/2008 | Broos et al. | 725/38 |

FOREIGN PATENT DOCUMENTS

| | | |
|---|---|---|
| EP | 2 151 994 A1 | 2/2010 |
| WO | 02/103470 A2 | 12/2002 |

OTHER PUBLICATIONS

Extended European search report dated Apr. 6, 2010, issued in a counterpart European Patent Application No. 09177550.2-2202.
Communication issued Apr. 30, 2012 by the European Patent Office in counterpart European Application No. 09177550.2.

* cited by examiner

*Primary Examiner* — Nasser Goodarzi
*Assistant Examiner* — Paul Graham
(74) *Attorney, Agent, or Firm* — Sughrue Mion, PLLC

(57) ABSTRACT

A display apparatus and a method for scheduling a broadcast using the same. The broadcast scheduling method includes generating a program information table, in which broadcast information is arranged, if a broadcast program selected by a user in the program information table is moved into an area adjacent to an icon, displaying the broadcast program being added to an item folder, and scheduling the broadcast program.

24 Claims, 5 Drawing Sheets

DISPLAY APPARATUS AND METHOD FOR SCHEDULING BROADCAST USING THE SAME

CROSS-REFERENCE TO RELATED APPLICATIONS

This application claims priority from Korean Patent Application No. 10-2009-0002628, filed on Jan. 13, 2009, and Korean Patent Application No. 10-2009-0083202, filed on Sep. 3, 2009 in the Korean Intellectual Property Office, the disclosures of which are incorporated herein by reference in their entireties.

BACKGROUND OF THE INVENTION

1. Field of the Invention

Apparatuses and methods consistent with the present invention relate to a display apparatus and a method for scheduling a broadcast using the same, and more particularly, to a display apparatus which automatically schedules a broadcast program by dragging the broadcast program and a method for scheduling a broadcast using the same.

2. Description of the Related Art

In general, display apparatuses generate an image to be displayed, add a background to the image, and display the image. Examples of display apparatuses may include digital televisions, mobile phones, personal computers, laptop computers, and electronic devices that display video signals on a display.

A related art display apparatus schedules a broadcast program provided by an electronic program guide using a direction key, such as an up key, a down key, a left key, a right key, and an enter key. More specifically, a user selects a broadcast program to be scheduled by inputting a program scheduling operation using a direction key, and schedules the selected broadcast program using the enter key.

As a result, to schedule a broadcast program, the user must go through a plurality of operations and manipulate the direction keys and the enter key at each operation, which is inconvenient.

Therefore, there is a need for scheduling a broadcast program with greater ease and convenience.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention provides a display apparatus which automatically schedules a broadcast program selected by touch of a user, and a method for scheduling a broadcast program using the same.

Another aspect of the present invention provides a method for scheduling a broadcast program if an icon for a broadcast program selected by the user in a program information table is moved into a display area of or an area adjacent to an icon for setting scheduling, and a display apparatus using the same.

According to an exemplary aspect of the present invention, there is provided a broadcast scheduling method including generating a program information table in which broadcast information is arranged, determining whether a broadcast program selected by a user in the program information table is moved into an area adjacent to an icon, displaying the broadcast program being added to an item folder if it is determined that the broadcast program is moved into the area, and scheduling the broadcast program.

In the scheduling operation, if on-screen display (OSD) information indicating the broadcast program selected by the user is moved to the area adjacent to the icon, the broadcast program may be automatically scheduled.

The broadcast scheduling method may further include transmitting scheduling information of the broadcast program included in the item folder to an external device if on-screen display (OSD) information of the broadcast program selected by the user is moved to the area adjacent to the icon.

The icon may be an image for the item folder, which is a folder that stores at least one of broadcast programs scheduled by the user, music files, still image files, and movie files which are frequently used by the user, and in the scheduling operation, if the broadcast program selected by the user is moved to the area adjacent to the icon, the broadcast program included in the item folder may be automatically scheduled.

The broadcast scheduling method may further include outputting the program information table to a display, wherein in the scheduling operation, if the broadcast program is dragged by the user touching the display and is moved into the area adjacent to the icon, the broadcast program is automatically scheduled.

The broadcast scheduling method may further include displaying the program information table from which the broadcast program is removed after the broadcast program is added to the item folder.

The broadcast scheduling method may further include displaying the program information table in which the broadcast program returns to an original place after the broadcast program is included in the item.

In the displaying operation, at least one of color and shape of the broadcast program which is arranged in the program information table may be changed and displayed so as to indicate that the broadcast program is scheduled.

According to another exemplary aspect of the present invention, there is provided a display apparatus including a graphical user interface (GUI) generation unit which generates a program information table in which broadcast information is arranged, and a control unit which, if a broadcast program selected by a user in the program information table is moved into an area adjacent to an icon, controls the GUI generation unit to display the broadcast program being added to an item folder and automatically schedules the broadcast program.

If on-screen display (OSD) information indicating the broadcast program selected by the user is moved to the area adjacent to the icon, the control unit may insert the broadcast program into the item folder so that the broadcast program can be automatically scheduled.

The control unit may transmit scheduling information of the broadcast program included in the item folder to an external device if on-screen display (OSD) information of the broadcast program selected by the user is moved to the area adjacent to the icon.

The icon may be an image for the item folder, which is a folder that stores at least one of broadcast programs scheduled by the user, music files, still image files, and movie files which are frequently used by the user, and if the broadcast program selected by the user is moved to the area adjacent to the icon, the control unit may automatically schedule the broadcast program included in the folder.

The display apparatus may further include a video output unit which outputs the program information table to a display, wherein if the broadcast program is dragged by the user touching the display is moved into the area adjacent to the icon, the control unit may automatically schedule the broadcast program.

The control unit may control the GUI generation unit to display the program information table from which the broadcast program is removed after the broadcast program is added to the item folder.

The control unit may control the GUI generation unit to display the program information table in which the broadcast program returns to an original place after the broadcast program is added to the item folder.

The control unit may control at least one of color and shape of the broadcast program, which is arranged in the program information table, to be changed and displayed in order to indicate that the broadcast program is scheduled.

The display apparatus may be a broadcast receiving apparatus that displays the program information table.

The display apparatus may be a portable device that transmits broadcast program information scheduled by the user to a broadcast receiving apparatus, and the display apparatus may operate the broadcast receiving apparatus by remote control.

The portable device may play back at least one of broadcast program, music, still images, and movies that are included in the item folder expressed using the icon. The portable device may download the program information table from at least one of a server and the broadcast receiving apparatus.

According to yet another exemplary aspect of the present invention, there is provided a broadcast scheduling method including displaying a program information table in which broadcast information is arranged, scheduling a broadcast program if a first icon for the broadcast program selected by a user in the program information table is moved into a display area of or an area adjacent to a second icon for setting scheduling.

The scheduling operation may include controlling the first icon to move towards the second icon if the first icon is moved to the area adjacent to the second icon.

The scheduling operation may further include comparing a starting time of the broadcast program with a current time, wherein if the starting time of the broadcast program is later than the current time, the broadcast program is scheduled.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
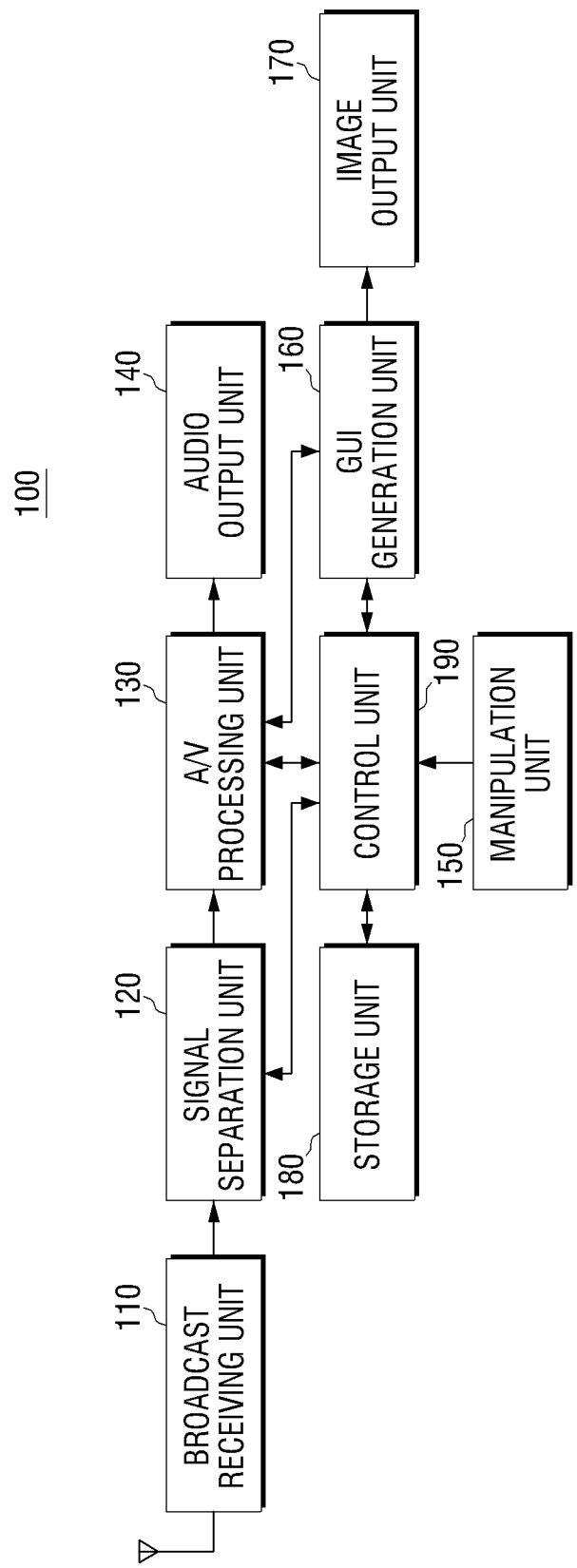
FIG. 1 is a schematic block diagram of a display apparatus according to an exemplary embodiment of the present invention.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

FIG. 1 is a schematic block diagram of a display apparatus according to an exemplary embodiment of the present invention. In this exemplary embodiment, a program information table, in which broadcast information is arranged, is limited to an Electronic Program Guide (EPG) for convenience of explanation.

In addition, the display apparatus in FIG. 1 is limited to a broadcast receiving apparatus for convenience of explanation.

Referring to FIG. 1, a broadcast receiving apparatus 100 may include a broadcast receiving unit 110, a signal separation unit 120, an A/V (audio/video) processing unit 130, an audio output unit 140, a manipulation unit 150, a graphical user interface (GUI) generation unit 160, an image output unit 170, a storage unit 180, and a control unit 190.

The broadcast receiving unit 110 receives and a broadcast from a source such as a broadcasting station or a satellite, wirelessly or through a wired line, and demodulates the broadcast. The broadcast signal received by the broadcast receiving unit 110 includes a Program and System Information Protocol (PSIP) which is an additional information signal, and a PSIP includes EPG information.

The signal separation unit 120 separates a video signal, an audio signal, and an additional information signal from the broadcast signal, transmits the video signal and the audio signal to the A/V processing unit 130, and transmits the additional information signal to the control unit 190.

The A/V processing unit 130 performs processing of the video signal and the audio signal received from the broadcast receiving unit 110 and the control unit 190, such as video decoding, video scaling, and audio decoding, transmits the video signal to the GUI generation unit 150, and transmits the audio signal to the audio output unit 140.

In addition, the A/V processing unit 130 outputs an audio signal, informing the user that a broadcast program selected by the user is added to an item folder, to the audio output unit 140 according to the control of the control unit 190.

If the received video and audio signal is stored in the storage unit 180, the A/V processing unit 130 transmits video and audio in a compression format to the storage unit 180.

The audio output unit 140 outputs an audio signal transmitted from the A/V processing unit 130 to a speaker (not shown) or to an external device connected through an external output terminal (not shown).

The manipulation unit 150 allows the user to manipulate the broadcast receiving apparatus 100. That is, the manipulation unit 150 transmits user commands to select and schedule a broadcast program in an EPG displayed by the user's manipulation to the control unit 190. The manipulation unit 150 may be implemented as a touch screen or a touch panel. The user can select and schedule a desired broadcast program by touching the touch screen or the touch pad.

The GUI generation unit 160 generates a GUI to be shown to the user, and adds the GUI to video output by the A/V processing unit 130.

In addition, the GUI generation unit 160 generates a GUI regarding EPG information input by the control unit 190. Further, the GUI generation unit 160 generates a GUI showing that a broadcast program selected by the user is being absorbed in the item folder and adds the GUI to the EPG image according to the control of the control unit 190. In this case, for example, the GUI generation unit 160 generates a GUI of an arrow shape so as to show that a broadcast program is being absorbed in the item folder.

The image output unit 170 displays video output by the A/V processing unit 130 on a display or an external device (for example, an external display) connected through an external output terminal (not shown). In addition, the image output unit 170 displays a GUI regarding EPG generated by the GUI generation unit 160 on the display.

The storage unit 180 stores a recording file of a broadcast program received by the broadcast receiving unit 110 and an EPG In addition, the storage unit 180 stores at least one image showing that a broadcast program is being absorbed in the item folder. The image may be a still image or a movie. The storage unit 180 may be implemented as a hard disk, a non-volatile memory, or the like.

If a user command to select a broadcast program is input to the manipulation unit 150, the control unit 190 determines if on-screen display (OSD) information indicating the selected broadcast program is positioned within a preset range. If the OSD information indicating the selected broadcast program is positioned within the preset range, the control unit 190 adds the selected broadcast program to the item folder so that the selected broadcast program can be automatically scheduled. The preset range is preset to be an area adjacent to the item folder.

Figure 2:
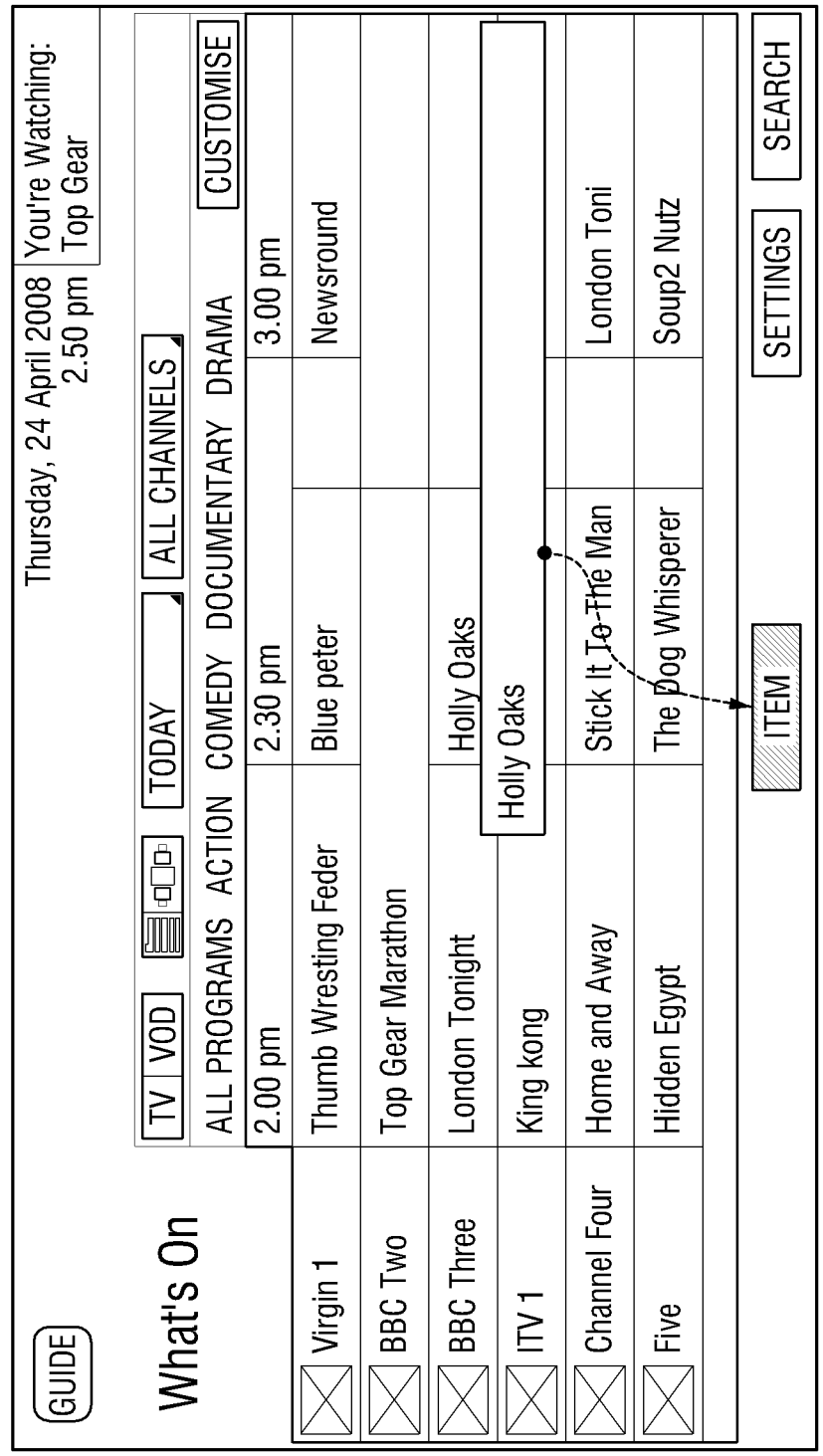
FIG. 2 shows an operation of adding a broadcast program which is selected and dragged by touch by a user to an item folder.

More specifically, referring to FIG. 2, among the broadcast programs in an EPG, if "Holly Oaks" is selected and moved by touch and drag of the user, the control unit 190 determines if the selected and moved broadcast program is positioned within a preset range.

If the control unit 190 determines that "Holly Oaks" is positioned within the preset range, the control unit 190 adds "Holly Oaks" to the item folder so that "Holly Oaks" can be automatically scheduled. That is, if the user drags "Holly Oaks" into an area adjacent to an icon indicating the item folder, the control unit 190 schedules "Holly Oaks" by adding "Holly Oaks" to the item folder.

The item folder provides at least one of a list of scheduled broadcast programs, a list of still images, a list of movies, and a list of music files. The still images, movies, and music files may indicate files which the user frequently uses and may be set by the user.

If the broadcast program selected by the user is added to the item folder, the control unit 190 controls the GUI generation 160 to provide the user with an EPG from which the selected broadcast program is removed. In addition, the control unit 190 may control the GUI generation 160 to provide an EPG informing the user that the selected broadcast program is scheduled after the selected broadcast program is added to the item folder. The scheduled broadcast program can be expressed by changing at least one of color and shape of the broadcast program on the EPG.

If the control unit 190 determines that "Holly Oaks" is not positioned in the preset range, the control unit 190 controls the GUI generation unit 160 to show that "Holly Oaks" is dragged and moved by the user.

Figure 3:
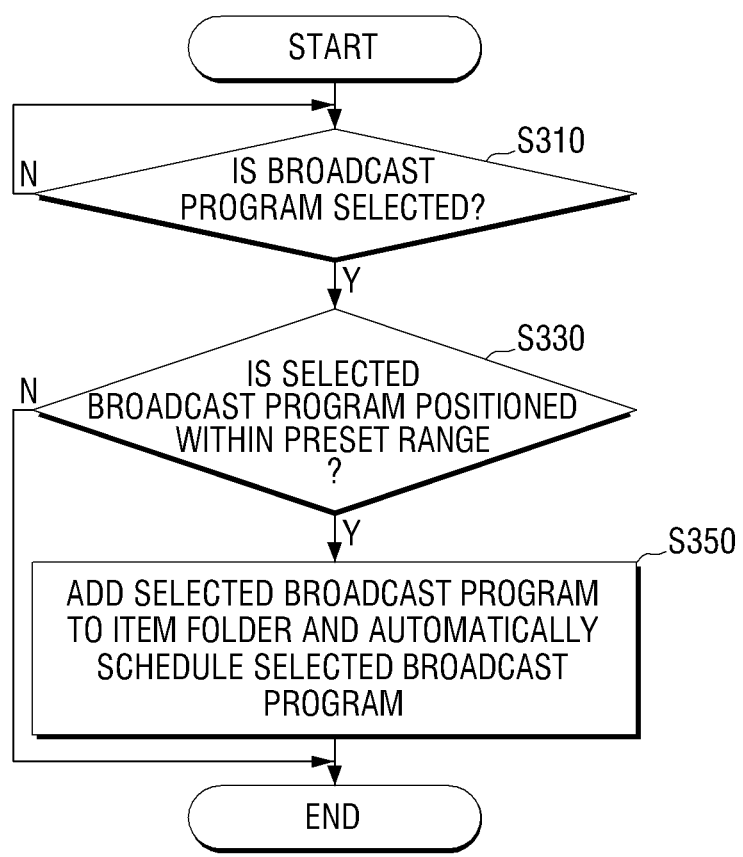
FIG. 3 is a flow chart illustrating an operating method of a display apparatus according to an exemplary embodiment of the present invention.

FIG. 3 is a flow chart illustrating an operating method of scheduling a broadcast program using a display apparatus according to an exemplary embodiment of the present invention.

Referring to FIG. 3, if an icon for a broadcast program is selected by touch of the user (S310:Y), the control unit 190 determines if the selected broadcast program icon is positioned within a preset range (S330).

More specifically, the control unit 190 determines if a broadcast program icon, which the user selects by touch using the manipulation unit 150, is moved into the preset range by the user. The preset range is preset to be an area adjacent to an icon for the item folder.

The preset range may vary if necessary. The preset range may be preset to be a display area of the item folder icon. In addition, the preset range may be preset to include both display area and adjacent area of the item folder icon.

In FIG. 2, among the broadcast programs in the EPG, an icon having an outline indicating "Holly Oaks" which is selected and moved by touch and drag of the user is a broadcast program icon.

In addition, in FIG. 2, an icon shown by "ITEM" which a broadcast program icon to be scheduled is moved towards is an item folder icon.

If the control unit 190 determines that the selected broadcast program icon is positioned within the preset range (S330: Y), the control unit 190 adds the selected broadcast program to the item folder so that the selected broadcast program can be automatically scheduled (S350).

In operation S350, the control unit 190 controls the GUI generation unit 160 to display a visual effect showing that the broadcast program icon is being absorbed in the item folder icon (that is, showing that the broadcast program icon is moving into the item folder icon and finally disappears).

The item folder provides at least one of a list of scheduled broadcast programs, a list of still images, a list of movies, and a list of music files.

If the broadcast program selected by the user is added to the item folder, the control unit 190 controls the GUI generation 160 to provide the user with an EPG from which the selected broadcast program is removed. In addition, the control unit 190 may control the GUI generation 160 to provide an EPG informing the user that the selected broadcast program is scheduled after the selected broadcast program is added to the item folder.

In operation S350, it may be only possible to set scheduling of a broadcast program which is not yet started. That is, the control unit 190 compares the starting time of a selected broadcast program with the current time, and schedules of the selected broadcast program if the starting time of the selected broadcast program is later than the current time.

Figure 4:
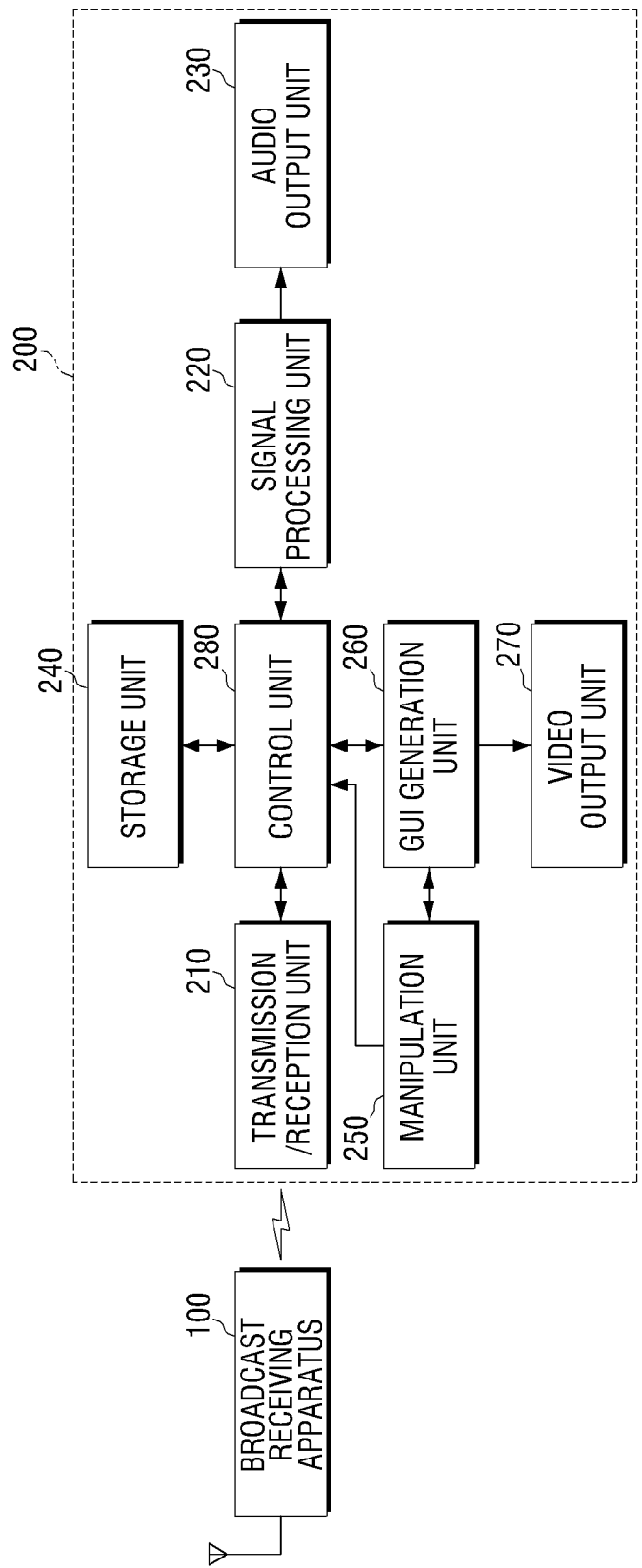
FIG. 4 is a schematic block diagram of a display apparatus according to another exemplary embodiment of the present invention.

FIG. 4 is a schematic block diagram of a display apparatus according to another exemplary embodiment of the present invention. Hereinbelow, the display apparatus is limited to a portable device for convenience of explanation. The main function of the portable device 200 is to operate as a remote controller for operating the broadcast receiving apparatus 100 by remote control, and subsidiary functions of the portable device 200 such as playing back music, still images, or movies.

Referring to FIG. 4, the portable device 200 may include a transmission/reception unit 210, a signal processing unit 220, an audio output unit 230, a storage unit 240, a manipulation unit 250, a graphical user interface (GUI) generation unit 260, a video output unit 270, and a control unit 280.

The transmission/reception unit 210 receives EPG information from a server (not shown) or a broadcast receiving apparatus 100, wirelessly or through a wired line, and transmits broadcast program scheduling information to the broadcast receiving apparatus 100.

The signal processing unit 220 processes a video signal and an audio signal read from the storage unit 240 by control of the control unit 280, such as video decoding, video scaling, and audio decoding, transmits the video signal to the GUI generation unit 260, and transmits the audio signal to the audio output unit 230.

In addition, the signal processing unit 220 outputs an audio signal, informing the user that a broadcast program selected by the user is added to an item folder, to the audio output unit 230.

The audio output unit 230 outputs an audio signal transmitted from the signal processing unit 220 to a speaker (not shown) or to an external device connected through an external output terminal (not shown).

The storage unit 240 stores the EPG received by the transmission/reception unit 210, recording files of a broadcast program downloaded from the server (not shown), and video files. In addition, the storage unit 240 stores at least one image showing that a broadcast program is being absorbed in the item folder. The image may be a still image or a movie. The storage unit 240 may be implemented as a hard disk, a non-volatile memory, or the like.

The manipulation unit 250 allows the user to manipulate the portable device 200. That is, the manipulation unit 250 transmits user commands to select and schedule a broadcast program in an EPG displayed on a display provided on the portable device 200 by the user's manipulation to the control unit 280. The manipulation unit 250 may be implemented as a touch screen or a touch panel. The user can select and schedule a desired broadcast program by touching the touch screen of the touch panel.

The GUI generation unit 260 generates a GUI to be shown to the user. In addition, the GUI generation unit 260 generates a GUI regarding EPG information input by the control unit 280, and generates a GUI showing that a broadcast program selected by the user is being absorbed in the item folder and adds the GUI to the EPG image. In this case, for example, the GUI generation unit 260 generates a GUI of an arrow shape so as to show that a broadcast program is being absorbed in the item folder.

The video output unit 270 displays video output by the signal processing unit 220 on a display or an external device (for example, an external display) connected through an external output terminal (not shown). In addition, the video output unit 270 displays a GUI regarding EPG generated by the GUI generation unit 260 on the display.

If a user command to select a broadcast program is input to the manipulation unit 250 by the user, the control unit 280 determines if the selected broadcast program is positioned within a preset range. If the selected broadcast program is positioned within the preset range, the control unit 280 adds the selected broadcast program to the item folder so that the selected broadcast program can be automatically scheduled. The preset range is preset to be an area adjacent to the item folder.

The control unit 280 generates broadcast program scheduling information including at least one scheduled broadcast program, and controls the transmission/reception unit 210 to transmit the broadcast program scheduling information to the broadcast receiving apparatus 100.

Figure 5:
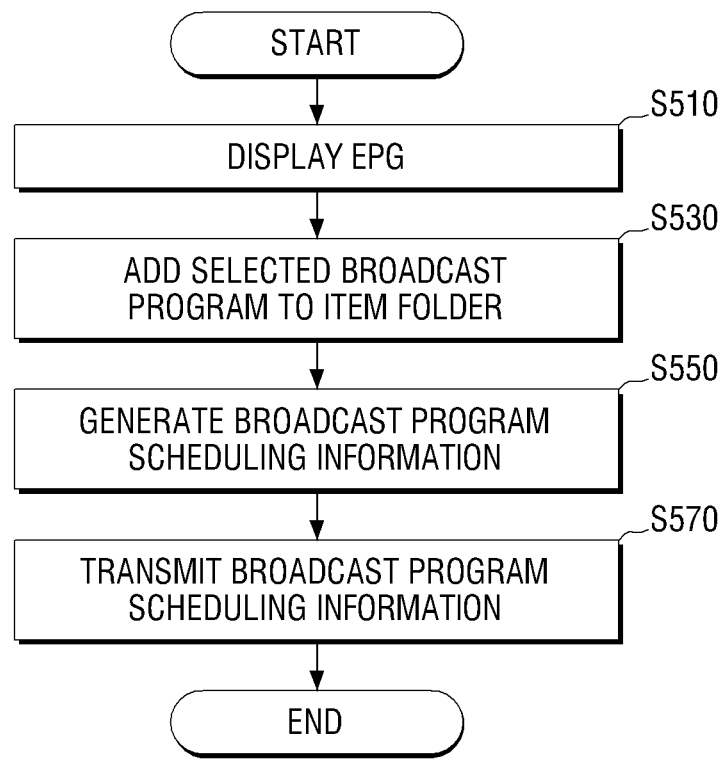
FIG. 5 is a flow chart illustrating an operating method of a display apparatus according to another exemplary embodiment of the present invention.

FIG. 5 is a flow chart illustrating an operating method of scheduling a broadcast program using a display apparatus according to another exemplary embodiment of the present invention.

Referring to FIG. 5, the portable device 200 receives EPG information from the broadcast receiving apparatus 100 or the server (not shown) and displays the EPG (S510).

Subsequently, if an icon for a broadcast program which is selected by touch and drag of the user is moved into a preset range, the portable device 200 adds the selected broadcast program to an item folder (S530). Operation S530 is performed in the same manner as operations S310 to S350 described above, so detailed description is not repeated.

The control unit 280 generates broadcast program scheduling information (S550). That is, the control unit 280 generates scheduling information regarding the broadcast program which is added to the item folder and is included in a list of broadcast programs. The broadcast program scheduling information includes at least one scheduled broadcast program. The item folder provides at least one of a list of scheduled broadcast programs, a list of still images, a list of movies, and a list of music files.

Subsequently, the control unit 280 transmits the generated broadcast program scheduling information to the broadcast receiving apparatus 100 (S570). That is, the control unit 280 controls the transmission/reception unit 210 to transmit the generated broadcast program scheduling information to the broadcast receiving apparatus 100. The transmission/reception unit 210 can receive a confirmation message in response to the broadcast program scheduling information from the broadcast receiving apparatus 100. If the transmission/reception unit 210 does not receive a confirmation message from the broadcast receiving apparatus 100 within a preset period of time, the control unit 280 can control the transmission/reception unit 210 to retransmit the broadcast program scheduling information to the broadcast receiving apparatus 100.

As described above, if a broadcast program selected by the user is moved into a preset area adjacent to the item folder, both an image and audio information indicating that the broadcast program is being absorbed in the item folder are provided. However, the present invention is not limited thereto. It is also possible to provide at least one of the image and the audio.

As described above, the display mounted in the portable device 200 provides an EPG, generates an EPG GUI to be changed by manipulation of the user, and outputs the EPG GUI to the display of the portable device 200. However, the present invention is not limited thereto. It is also possible that the user manipulates an EPG provided by the display of the portable device 200 using a touch screen or a touch panel provided on the portable device 200 so that the changed EPG GUI can be transmitted to the broadcast receiving apparatus 100.

That is, an EPG can be changed on the display of the portable device 200 by output or manipulation of the user, and the changed EPG can be output to an internal display or an external display of the broadcast receiving apparatus 100.

Furthermore, the display mounted in the portable device 200 provides an EPG and schedules a broadcast program, and the broadcast receiving apparatus 100 can continue to play back an on-air broadcast program.

Furthermore, subsidiary functions of the portable device 200 are playing back music, still images, or movies, but are not limited thereto. It is possible that subsidiary functions of the portable device 200 may include playing back broadcast programs and video files, and phone calls.

Furthermore, the item folder stores at least one of broadcast programs scheduled by the user, music files, still image files, and movie files which are frequently used by the user, but is not limited thereto. If the item folder is selected by the user, the control unit can control the GUI generation unit to display a list of scheduled broadcast programs which are stored in different places, and a list of music files, still image files, and movie files which are set to be favorites by the user.

As can be appreciated from the above description of a display apparatus and a method for scheduling a broadcast using the same, a broadcast program is selected by touch of the user and dragged into an area adjacent to a specific folder and is thus automatically scheduled.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A broadcast scheduling method, comprising:
    generating a program information table in which broadcast information is arranged;
    determining whether a first icon for a broadcast program selected by a user in the program information table is moved into an area adjacent to a second icon;
    comparing a starting time of the broadcast program selected by the user with a current time after determining that the first icon for the broadcast program is moved into the area adjacent to the second icon;
    displaying a visual effect in which the first icon for the broadcast program is added to an item folder if the starting time of the broadcast program selected by the user is later than the current time, and not displaying the visual effect if the starting time is not later than the current time; and
    scheduling the broadcast program if the starting time of the broadcast program selected by the user is later than the current time, and not scheduling the broadcast program if the starting time is not later than the current time.

2. The broadcast scheduling method of claim 1, wherein in the scheduling operation, if on-screen display (OSD) information indicating the first icon for the broadcast program selected by the user is moved to the area adjacent to the second icon, the broadcast program is automatically scheduled.

3. The broadcast scheduling method of claim 1, further comprising:
    transmitting scheduling information of the broadcast program included in the item folder to an external device if on-screen display (OSD) information of the first icon for the broadcast program selected by the user is moved to the area adjacent to the second icon.

4. The broadcast scheduling method of claim 1, wherein the second icon is an image for the item folder, which is a folder that stores at least one of broadcast programs scheduled by the user, music files, still image files, and movie files which are frequently used by the user, and
    in the scheduling operation, if the first icon for the broadcast program selected by the user is moved to the area adjacent to the second icon, the broadcast program included in the item folder is automatically scheduled.

5. The broadcast scheduling method of claim 1, further comprising:
    outputting the program information table to a display,
    wherein in the scheduling operation, if the first icon for the broadcast program is dragged by the user touching the display and is moved into the area adjacent to the second icon, the broadcast program is automatically scheduled.

6. The broadcast scheduling method of claim 1, further comprising:
    displaying the program information table from which the first icon for the broadcast program is removed after the first icon for the broadcast program is added to the item folder.

7. The broadcast scheduling method of claim 1, further comprising:
    displaying the program information table in which the first icon for the broadcast program returns to an original place after the first icon for the broadcast program is added to the item folder.

8. The broadcast scheduling method of claim 1, wherein in the displaying operation, at least one of color and shape of the first icon for the broadcast program, which is arranged in the program information table, is changed and displayed so as to indicate that the broadcast program is scheduled.

9. A display apparatus, comprising:
    a graphical user interface (GUI) generation unit which generates a program information table in which broadcast information is arranged; and
    a control unit which, if a first icon for a broadcast program selected by a user is moved into an area adjacent to a second icon, compares a starting time of the broadcast program selected by the user with a current time after determining that the first icon is moved into the area adjacent to the second icon, controls the GUI generation unit to display a visual effect in which the first icon for the broadcast program is added to an item folder if the starting time of the broadcast program selected by the user is later than the current time, and not to display the visual effect if the starting time is not later than the current time, and automatically schedules the broadcast program if the starting time of the broadcast program selected by the user is later than the current time, not schedules the broadcast program if the starting time is not later than the current time.

10. The display apparatus of claim 9, wherein, if on-screen display (OSD) information indicating the first icon for the broadcast program selected by the user is moved to the area adjacent to the second icon, the control unit inserts the first icon for the broadcast program into the item folder so that the broadcast program can be automatically scheduled.

11. The display apparatus of claim 9, wherein the control unit transmits scheduling information of the broadcast program included in the item folder to an external device if on-screen display (OSD) information of the first icon for the broadcast program selected by the user is moved to the area adjacent to the second icon.

12. The display apparatus of claim 9, wherein the second icon is an image for the item folder, which a folder that stores at least one of broadcast programs scheduled by the user, music files, still image files, and movie files which are frequently used by the user, and
    if the first icon for the broadcast program selected by the user is moved to the area adjacent to the second icon, the control unit automatically schedules the broadcast program included in the item folder.

13. The display apparatus of claim 9, further comprising:
    a video output unit which outputs the program information table to a display,
    wherein if the first icon for the broadcast program is dragged by the user touching the display and is moved into the area adjacent to the second icon, the control unit automatically schedules the broadcast program.

14. The display apparatus of claim 9, wherein the control unit controls the GUI generation unit to display the program information table from which the first icon for the broadcast program is removed after the first icon for the broadcast program is added to the item folder.

15. The display apparatus of claim 9, wherein the control unit controls the GUI generation unit to display the program information table in which the first icon for the broadcast program returns to an original place after the first icon for the broadcast program is added to the item folder.

16. The display apparatus of claim 9, wherein the control unit controls at least one of color and shape of the first icon for the broadcast program, which is arranged in the program information table, to be changed and displayed in order to indicate that the broadcast program is scheduled.

17. The display apparatus of claim 9, wherein the display apparatus is a broadcast receiving apparatus that displays the program information table.

18. The display apparatus of claim 9, wherein the display apparatus is a portable device that transmits broadcast program information scheduled by the user to a broadcast receiving apparatus, and the display apparatus operates the broadcast receiving apparatus by remote control.

19. The display apparatus of claim 18, wherein the portable device plays back at least one of broadcast program, music, still images, and movies that are included in the item folder expressed using the icon.

20. The display apparatus of claim 18, wherein the portable device downloads the program information table from at least one of a server and the broadcast receiving apparatus.

21. A broadcast scheduling method, comprising:
displaying a program information table in which broadcast information is arranged; and
automatically scheduling a broadcast program if a first icon for the broadcast program selected by a user in the program information table is moved into a display area of or an area adjacent to a second icon and a starting time of the broadcast program is later han a current time when comparing the starting time of the broadcast program with the current time.

22. The broadcast scheduling method of claim 21, wherein the scheduling operation comprises:
controlling the first icon to move towards the second icon if the first icon is moved to the area adjacent to the second icon.

23. The broadcast scheduling method of claim 1, wherein the generating, the determining, the comparing, the displaying, and the scheduling are performed by a digital TV.

24. The display apparatus of claim 9, wherein the display apparatus is a digital TV.

* * * * *